United States Patent
Doyle et al.

[15] 3,699,227
[45] Oct. 17, 1972

[54] PHARMACEUTICAL COMPOSITIONS OF PHENYL PYRIDYL ALKANOIC ACID AND DERIVATIVES THEREOF

[72] Inventors: Peter Doyle; Joseph Gilbert Stacey, both of Macclesfield, England

[73] Assignee: Imperial Chemical Industries Limited, London, England

[22] Filed: Aug. 5, 1970

[21] Appl. No.: 61,406

Related U.S. Application Data

[62] Division of Ser. No. 682,593, Nov. 13, 1967, Pat. No. 3,546,237.

[52] U.S. Cl. ..................................424/263
[51] Int. Cl. ..............................A61k 27/00
[58] Field of Search............................424/263

[56] References Cited

UNITED STATES PATENTS 3,396,224  8/1968  Van Heyningen.........260/295
3,381,015  4/1968  Shen et al..................260/295

Primary Examiner—Stanley J. Friedman
Attorney—Cushman, Darby & Cushman

[57] ABSTRACT

This disclosure relates to phenyl-pyridyl-alkanoic acids and derivatives which possess anti-inflammatory, analgesic and antipyretic activity, and which reduce the concentration of fibrinogen, cholesterol and triglycerides in blood. It also relates to processes for making said compounds, to pharmaceutical compositions, and to methods of treatment involving said compounds. A representative of said compounds is 6-(4-chlorophenyl)-2-methylpyrid-3-ylacetic acid.

8 Claims, No Drawings

PHARMACEUTICAL COMPOSITIONS OF PHENYL PYRIDYL ALKANOIC ACID AND DERIVATIVES THEREOF

This is a division of our copending application, Ser. No. 682,593, filed Nov. 13, 1967, now U.S. Pat. No. 3,546,237.

This invention relates to heterocyclic compounds and more particularly it relates to new pyridine derivatives which have anti-inflammatory, analgesic and antipyretic activity, and which reduce the concentration of fibrinogen and of cholesterol and/or triglycerides in blood and which may therefore be useful in the treatment of prophylaxis of coronary artery disease and atherosclerosis.

According to the invention we provide pyridine derivatives of the formula:

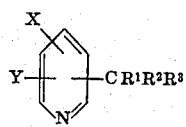

wherein X stands for hydrogen, an alkyl or alkoxy radical of not more than three carbon atoms, or a halogen atom, and Y stands for a phenyl radical optionally substituted by not more than two halogen atoms, and $R^1$ stands for hydrogen or an alkyl radical of not more than three carbon atoms, and $R^2$ stands for hydrogen, an alkyl radical of not more than three carbon atoms, or an alkoxycarbonyl radical of not more than six carbon atoms, and $R^3$ stands for a radical of the formula —$CONH_2$ or —$CO_2R^4$, wherein $R^4$ stands for hydrogen or an alkyl radical of not more than 5 carbon atoms, and wherein the Y and —$CR^1R^2R^3$ radicals are linked to non-adjacent carbon atoms of the pyridine nucleus, and salts thereof.

It is to be understood that the above definition does not include compounds wherein the radicals represented by Y and —$CR^1R^2R^3$ occupy adjacent positions on the pyridine nucleus, and similarly the definitions of various intermediates given below do not include compounds wherein the radicals which correspond to Y and —$CR^1R^2R^3$ occupy adjacent positions on the pyridine nucleus.

As a suitable value for X there may be mentioned, for example, hydrogen, a methyl or methoxy radical, or a chlorine or bromine atom.

As a suitable value for the halogen atom(s) which may optionally be present in the radical Y there may be mentioned fluorine, chlorine and bromine atoms. Compounds wherein Y contains one or two halogen substituents comprise a preferred embodiment of this invention because, generally speaking, they are more active than the corresponding unsubstituted phenyl derivatives.

As a suitable value for $R^1$ or $R^2$ when it stands for an alkyl radical there may be mentioned, for example, a methyl radical. As a suitable value for $R^2$ when it stands for an alkoxycarbonyl radical there may be mentioned the methoxycarbonyl or ethoxycarbonyl radical.

As a suitable value for $R^4$ when it stands for an alkyl radical there may be mentioned, for example the methyl or ethyl radical.

As suitable salts in the case where —$CR^1R^2R^3$ stands for an ester or amide group there may be mentioned pharmaceutically acceptable acid-addition salts, for example hydrochlorides, hydrobromides, sulphates or phosphates. In the case where $R^3$ stands for the carboxy radical (—$CO_2H$), suitable salts are salts with alkali metals or alkaline earth metals, aluminum salts, and salts with pharmaceutically-acceptable organic bases.

Preferred pyridine derivatives of the invention are 6-(4-chlorophenyl)-2-methylpyrid-3-ylacetic acid, α-[6-(4-chlorophenyl)-2-methylpyrid-3-yl]propionic acid, dimethyl 5-(4-chlorophenyl)pyrid-2-ylmalonate, sodium 5-(4-chlorophenyl)pyrid-2-ylacetate, sodium 3-(4-chlorophenyl)-2-methoxypyrid-6-ylacetate, and sodium 2-(4-chlorophenyl)pyrid-4-ylacetate, and of these the first two are particularly preferred.

According to a further feature of the invention we provide a process for the manufacture of pyridine derivatives of the formula:

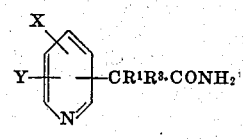

wherein X, Y, $R^1$ and $R^2$ have the meanings stated above, and salts thereof, which comprises the hydrolysis of a pyridine derivative of the formula:

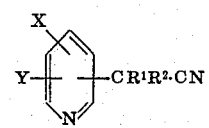

wherein X, Y, $R^1$ and $R^2$ have the meanings stated above.

The hydrolysis is carried out in the presence of water, and as a suitable hydrolytic agent there may be mentioned, for example, an acid, for example an inorganic acid, for example sulphuric acid, or an inorganic base, for example an alkali metal hydroxide, for example potassium hydroxide. A diluent, for example ethanol, may optionally be present. The hydrolysis may be accelerated or completed by the application of heat.

According to a further feature of the invention we provide a process for the manufacture of pyridine derivatives of the formula:

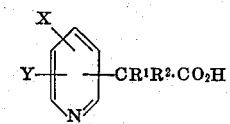

wherein X, Y, $R^1$ and $R^2$ have the meanings stated above, and salts thereof, which comprises the hydrolysis of a pyridine derivative of the formula:

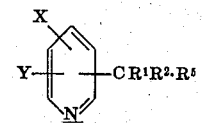

wherein X, Y, $R^1$ and $R^2$ have the meanings stated above, and $R^5$ stands for the cyano (—CN) or carbamoyl (—$CONH_2$) radical.

The hydrolysis is carried out in water, and an organic solvent, for example ethanol, may optionally be present. As a suitable hydrolytic agent there may be mentioned, for example, an inorganic base, for example an alkali metal hydroxide, for example sodium or potassium hydroxide, or an acid, for example an inorganic acid, for example hydrochloric acid.

According to a further feature of the invention we provide a process for the manufacture of pyridine derivatives of the formula:

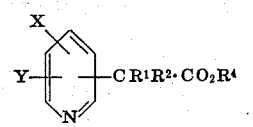

wherein X, Y, $R^1$ and $R^2$ have the meanings stated above, and $R^4$ stands for an alkyl radical of not more than five carbon atoms, and salts thereof, which comprises the esterification of a pyridine derivative of the formula:

wherein X, Y, $R^1$ and $R^2$ have the meanings stated above.

The esterification may be carried out by interaction of the carboxylic acid with a compound of the formula $R^4OH$, wherein $R^4$ stands for an alkyl radical of not more than five carbon atoms, and an inorganic acid, for example sulphuric acid, or dicyclohexylcarbodiimide. The reaction may optionally be carried out in an organic solvent, for example chloroform, and it may be accelerated or completed by the application of heat. Alternatively, the esterification may be carried out by the interaction of the carboxylic acid with the appropriate diazoalkane, for example diazomethane, in an organic solvent, for example a mixture of methanol and ether. Alternatively, the esterification may be carried out by the interaction of a metal salt of the appropriate carboxylic acid, for example an alkali metal salt, with a compound of the formula $R^4Hal$, wherein $R^4$ stands for an alkyl radical of not more than five carbon atoms, and Hal stands for a halogen atom, for example a chlorine or bromine atom. The reaction may optionally be carried out in an organic solvent, for example dimethylformamide, and it may optionally be accelerated or completed by the application of heat.

According to a further feature of the invention we provide a process for the manufacture of pyridine derivatives of the formula:

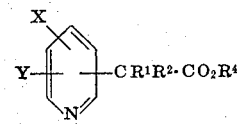

wherein X, Y, $R^1$ and $R^2$ have the meanings stated above, and $R^4$ stands for an alkyl radical of not more than 5 carbon atoms, and salts thereof, which comprises the interaction of a compound of the formula:

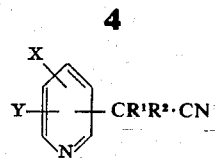

wherein X, Y, $R^1$ and $R^2$ have the meanings stated above, and a compound of the formula $R^4OH$, wherein $R^4$ has the meaning stated above, under acidic conditions, for example in the presence of sulphuric acid. The process may be accelerated or completed by the application of heat.

According to a further feature of the invention we provide a process for the manufacture of pyridine derivatives of the formula:

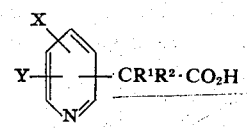

wherein X, Y, $R^1$ and $R^2$ have the meanings stated above, and salts thereof, which comprises the hydrolysis of a compound of the formula:

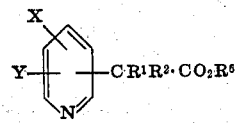

wherein X, Y, $R^1$ and $R^2$ have the meanings stated above, and $R^6$ stands for an alkyl, aralkyl or aryl radical.

As a suitable hydrolytic agent there may be mentioned, for example, an alkali metal hydroxide, for example sodium hydroxide. The hydrolysis is carried out in the presence of water, and one or more organic solvents, for example ethanol, may optionally also be present.

According to a further feature of the invention we provide a process for the manufacture of pyridine derivatives of the formula:

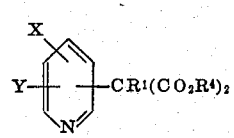

wherein X, Y and $R^1$ have the meanings stated above, and $R^4$ stands for an alkyl radical of not more than 5 carbon atoms, and salts thereof, which comprises the interaction of sodium or potassium or a hydride, amide or alkoxide thereof, with a carbonate of the formula $CO.(OR^4)_2$, wherein $R^4$ has the meaning stated above, and a compound of the formula:

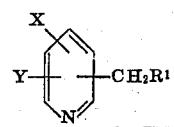

wherein X, Y and $R^1$ have the meanings stated above.

The reaction may be carried out in an excess of the appropriate carbonate, and the appropriate alkanol, for example methanol, may optionally be present. The reaction may be accelerated or completed by the application of heat. It is to be understood that in a case where X in the starting material stands for a halogen atom, for example a bromine atom, the last-named process can result in the production of the appropriate compound wherein X stands for the alkoxy radical corresponding to the carbonate used.

According to a further feature of the invention we provide a process for the manufacture of pyridine derivatives of the formula:

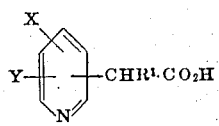

wherein X, Y and $R^1$ have the meanings stated above, which comprises the interaction of a compound of the formula:

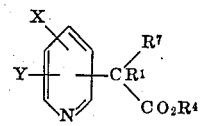

wherein X, Y and $R^1$ have the meanings stated above, $R^4$ stands for an alkyl radical of not more than five carbon atoms, and $R^7$ stands for the cyano radical (—CN) or an alkoxycarbonyl radical of not more than six carbon atoms, with an inorganic base or inorganic acid in the presence of water and under the influence of heat.

As a suitable inorganic base there may be mentioned, for example, an alkali metal hydroxide, and as a suitable inorganic acid there may be mentioned, for example, hydrochloric acid. The reaction may be carried out in the presence of an organic solvent, for example methanol.

According to a further feature of the invention we provide a process for the manufacture of pyridine derivatives of the formula:

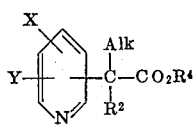

wherein X, Y, $R^2$ and $R^4$ have the meanings stated above, and Alk stands for an alkyl radical of not more than three carbon atoms, which comprises the alkylation of a compound of the formula:

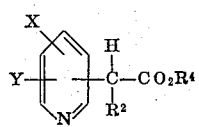

wherein X, Y, $R^2$ and $R^4$ have the meanings stated above.

The alkylation process can result in the introduction of one alkyl radical (e.g., in the product $R^1$ stands for alkyl and $R^2$ stands for alkoxycarbonyl), or in the introduction of two alkyl radicals (i.e., in the product $R^1$ and $R^2$ stand for alkyl). The alkylation may be carried out by reacting an alkyl metal derivative, for example the sodium derivative, of the appropriate pyridine derivative with an alkyl halide of not more than three carbon atoms, for example methyl iodide. The reaction may be carried out in the presence of an organic solvent, for example dimethylformamide.

According to a further feature of the invention we provide a process for the manufacture of pyridine derivatives of the formula:

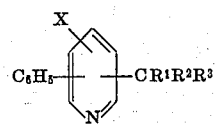

wherein X, $R^1$, $R^2$ and $R^3$ have the meanings stated above, which comprises the interaction of a compound of the formula:

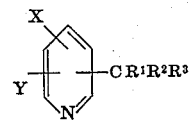

wherein X, $R^1$, $R^2$ and $R^3$ have the meanings stated above, and Y stands for a phenyl radical bearing not more than two halogen atoms, with hydrogen in the presence of a hydrogenation catalyst.

As a suitable hydrogenation catalyst there may be mentioned, for example, a palladium-on-carbon catalyst. The reaction may be carried out in the presence of an organic solvent, for example ethanol.

It is to be understood that the compounds used as starting materials in the processes described hereinbefore may all be obtained by general procedures which are well known in the art, as is illustrated in the Examples.

According to a further feature of the invention we provide pharmaceutical compositions comprising at least one pyridine derivative of the formula:

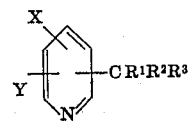

wherein X, Y, $R^1$, $R^2$ and $R^3$ have the meanings stated above, or a salt thereof, and a non-toxic, pharmaceutically acceptable diluent or carrier.

The pharmaceutical compositions may, for example, be in the form of tablets, pills, capsules, suppositories, non-sterile aqueous or non-aqueous solutions or suspensions, sterile injectable aqueous or non-aqueous solutions or suspensions, creams, lotions, or ointments.

These compositions may be obtained in conventional manner using conventional excipients. The compositions may optionally contain, in addition to at least one of the pyridine derivatives which characterize this invention, at least one known agent having anti-inflammatory and/or analgesic activity, for example aspirin, paracetamol, codeine, chloroquine, phenylbutazone, oxyphenbutazone, indomethacin, mefenamic acid, flufenamic acid, ibufenac, or an anti-inflammatory steroid, for example prednisolone. These compositions intended for oral administration may, in addition, optionally contain at least one anti-cholinergic agent, for example homatropine methyl bromide, and/or an antacid, for example aluminum hydroxide. Those compositions designed for topical application may, in addition, optionally contain a vasodilating agent, for example tolazoline, or a vasoconstricting agent, for example adrenaline; a local anaesthetic, for example amethocaine, or a counterirritant, for example capsicum; and/or at least one agent chosen from the following classes of substances: anti-bacterial agents, which includes sulphonamides and antibiotics having antibacterial action, for example neomycin; anti-fungal agents, for example hydroxyquinoline; anti-histaminic agents, for example promethazine; and rubefacient agents, for example methyl nicotinate.

The invention is illustrated but not limited by the following examples:

EXAMPLE 1

6-(4-Chlorophenyl)-3-cyanomethyl-2-methylpyridine (0.25g.) was dissolved in 96 percent sulphuric acid (3.6g.) and the resulting clear solution was stirred for 4 hours at ambient temperature. The solution was then added to a mixture of concentrated ammonium hydroxide (4.4g. density 0.88) and ice-water (15g.). The mixture was filtered and the solid residue was crystallized from a mixture of isopropanol and methanol. There was thus obtained 6-(4-chlorophenyl)-2-methylpyrid-3-ylacetamide, m.p. 213°–215°C.

The cyanomethyl compound used as starting material was obtained as follows:

A solution of ethyl 6-(4-chlorophenyl)-2-methylpyridine-3-carboxylate (20g.) in anhydrous ether (500ml.) was added to a stirred suspension of lithium aluminum hydride (4.9g.) in ether at such a rate that a gentle reflux was maintained. After 2 hours, the ethereal suspension was cooled and water (5ml.) was cautiously added, followed by 50 percent aqueous sodium hydroxide solution (3ml.) added cautiously, followed by water (17ml.). The suspension was stirred for 0.5 hour, dried over anhydrous magnesium sulphate, filtered, and the solvent was evaporated in vacuo. There was thus obtained 6-(4-chlorophenyl)-3-hydroxymethyl-2-methylpyridine which was sufficiently pure for use in the next stage. A sample crystallized from carbon tetrachloride had m.p. 113°–115°C.

Thionyl chloride (1.6ml.) was added dropwise to a stirred solution of 6-(4-chlorophenyl)-3-hydroxymethyl-2-methylpyridine (2.58g.) in anhydrous ethylene dichloride (50ml.), and the resulting mixture was stirred vigorously to redissolve the precipitate obtained after fifteen minutes. The resulting clear solution was evaporated to dryness after ninety minutes and the residue was stirred with anhydrous benzene (50ml.) The mixture was filtered, washed well with benzene, and dried on the filter. There was thus obtained 3-chloromethyl-6-(4-chlorophenyl)-2-methylpyridine hydrochloride which was sufficiently pure for use in the next stage. A sample of the chloromethyl compound crystallized from isopropanol had m.p. 171°–172°C.

A solution of 3-chloromethyl-6-(4-chlorophenyl)-2-methylpyridine hydrochloride (27g.) and sodium cyanide (16.2g.) in methanol (140ml.) was stirred under reflux in a nitrogen atmosphere for 2 hours. The resulting suspension was cooled and then concentrated in vacuo. The residue was thoroughly mixed with ether (800ml.) and water (100ml.). The organic layer was separated from the mixture and concentrated to 150ml. under reduced pressure. The mixture was then passed through a column consisting of neutral alumina (Woelm grade 1; 500g.), and the column was continuously eluted with ether until 500ml. of eluate had been collected. The solvent was evaporated, and there was obtained a solution which was crystallized from a mixture of ethyl acetate and petroleum ether (b.p. 60°–80 °C.). There was thus obtained 6-(4-chlorophenyl)-3-cyanomethyl-2-methylpyridine, m.p.102°–104°C.

EXAMPLE 2

A mixture of 6-(4-chlorophenyl)-3-cyanomethyl-2-methylpyridine (19g.), sodium hydroxide (22.4g.), and ethanol-water (7:3; 220ml.) was refluxed for 3 hours. The solvents were evaporated in vacuo, the residue was dissolved in water (300ml.), and the solution was washed with ether (330ml.). The aqueous solution was adjusted to pH 4 by the cautious addition of concentrated hydrochloric acid, and the resulting mixture was filtered. The solid residue was crystallized from ethyl acetate and there was thus obtained 6-(4-chlorophenyl)-2-methylpyrid-3-ylacetic acid, m.p. 180°–182°C.

EXAMPLE 3

6-(4-Chlorophenyl)-2-methylpyrid-3-ylacetic acid (7g.) was dissolved in methanol (230ml.) and the solution was added slowly to a solution of diazomethane (1.1g.) in ether (700ml.), which was cooled to 5°C. during the addition. The solvents were evaporated under reduced pressure, and the solid residue was dissolved in ether (100ml.), which was washed successively with 5 percent aqueous sodium carbonate (80ml.) and water (80ml.). The ethereal solution was dried over anhydrous sodium sulphate, and the solvent was then evaporated. The residue was crystallized from light petroleum (b.p.60°–80°C.) and there was thus obtained methyl 6-(4-chlorophenyl)-2-methylpyrid-3ylacetate, m.p.75°–76°C.

EXAMPLE 4

A suspension of 6-(4-chlorophenyl)-2-cyanomethylpyridine (6g.) in dry methanol (26ml.) was cooled to 0°C. in an ice-bath. Concentrated sulphuric acid (17g.) was slowly added, and the resulting pale yellow solution was refluxed for 18 hours. The reaction mixture was added to ice (150g.), and the pH of the solution was adjusted to 8 by means of concentrated ammonium hydroxide (density 0.88). The solution was extracted 3 times with ether (100ml.), and the solvent was then evaporated from the combined ethereal extracts. The residual solid was crystallized from petroleum ether (60°–80°C.), and there was obtained methyl 6-(4-chlorophenyl)pyrid-2-ylacetate, m.p.45°–46°C.

The cyanomethyl compound used as starting material was obtained as follows:

A solution of 6-(4-chlorophenyl)-2-methylpyridine (21g.) in chloroform (400ml.) was cooled to 0°C. in an ice-bath. m-Chloroperbenzoic acid (30.9g.) was slowly added in portions to the solution, and the solution was then kept at 0°–4°C. for 24 hours. The chloroform solution was shaken with 15 percent aqueous potassium carbonate solution (150ml.), and solid potassium carbonate was added to bring the pH of the aqueous layer to 9. The chloroform layer was separated from the mixture, and then dried, and the solvent was evaporated. There was thus obtained impure 6-(4-chlorophenyl)-2-methylpyridine N-oxide. This can be purified by crystallization from petroleum ether (b.p.60°–80°C.), and it then has m.p.92°–94°C.

The impure N-oxide (25g.) was dissolved in acetyl chloride (112ml.) and the mixture was refluxed for 6 hours. After evaporation of excess acetyl chloride, the residual brown oil, which consisted mainly of 2-acetoxymethyl-6-(4-chlorophenyl)pyridine hydrochloride and 2-chloromethyl-6-(4-chlorophenyl)pyridine hydrochloride, was dissolved in methanol (350ml.). A solution of sodium hydroxide (20g.) in water (20g.) was added, and the mixture was kept at ambient temperature for 2 hours. The methanol was evaporated in vacuo, and the residue was partitioned between ether and water. The ethereal layer was separated from the mixture, and the ether was evaporated. There was thus obtained a mixture of 6-(4-chlorophenyl)-2-hydroxymethylpyridine and 2-chloromethyl-6-(4-chlorophenyl)pyridine which was satisfactory for use in the next stage. To a solution of this mixture (22g.) in dry ethylene dichloride (300ml.) there was slowly added thionyl chloride (11ml.); the temperature of the reaction mixture not being allowed to exceed 35°–40°C. The suspension was stirred for 1.5 hours, and then filtered. There was thus obtained 2-chloromethyl-6-(4-chlorophenyl)-pyridine hydrochloride. Crystallization of this salt from isopropanol gave the corresponding base, m.p. 110°–111°C.

2-Chloromethyl-6-(4-chlorophenyl)pyridine hydrochloride (15g.) was dissolved in water (150ml.). Concentrated ammonium hydroxide (density 0.88; 4g.) was added to the solution, and the mixture was extracted three times with chloroform. The combined chloroform extracts were dried, the solvent was evaporated, and there was obtained crystalline 2-chloromethyl-6-(4-chlorophenyl)-pyridine. This solid was dissolved in dry methanol (230ml.), sodium cyanide (6.6g.) was added, and the mixture was refluxed in a nitrogen atmosphere for 10 hours. The reaction mixture was cooled, the solvent was evaporated and the residue was partitioned between ether and water. The mixture was separated and solvent was evaporated from the organic layer. The residual solid was dissolved in ether (200ml.), and the solution was passed through neutral alumina (Woelm, grade 1; 250g.). The solvent was evaporated from the eluate, and the residue was crystallized from a mixture of ethyl acetate and petroleum ether (b.p. 60°–80°C.). There was thus obtained 6-(4-chlorophenyl)-2-cyanomethylpyridine, m.p. 80°–82°C.

EXAMPLE 5

Methyl 6-(4-chlorophenyl)pyrid-2-ylacetate (0.15g.) was dissolved in a mixture of methanol (1ml.) and N-aqueous sodium hydroxide (1ml.). The mixture was stirred for 20 hours at ambient temperature. After evaporation of the methanol, the aqueous solution was diluted with water (1ml.), cooled in ice, and glacial acetic acid was added dropwise until precipitation was complete. The crystalline precipitate was separated by filtration, washed with distilled water, and crystallized from a mixture of acetone and petroleum ether (b.p. 60°–80C.) at or below ambient temperature. There was thus obtained 6-(4-chlorophenyl)pyrid-2-ylacetic acid, m.p. 98°–100°C. (decomp.).

EXAMPLE 6

5-(4-Chlorophenyl)-3-cyanomethyl-2-methylpyridine (6.05g.) was boiled under reflux for 2 hours with a 10 percent solution of potassium hydroxide in 2:1 ethanol: water (50ml.). The cooled solution was diluted with water (ca. 120ml.), and most of the ethanol was distilled off under reduced pressure. The aqueous solution was washed with ether, treated with decolorizing carbon, filtered, and brought to pH 6 by addition of acetic acid. The precipitated 5-(4-chlorophenyl)-2-methylpyrid-3-ylacetic acid was crystallized from methanol, and had a m.p. of 207°–209 °C. (decomp.).

The 5-(4-chlorophenyl)-3-cyanomethyl-2-methylpyridine used as starting material was obtained as follows:

Phosphorus oxychloride (110ml.) was added dropwise to dry dimethylformamide (146g.) which was stirred, and kept below 30°C. by cooling in an ice-bath. 4-Chlorophenylacetic acid (68.2g.) was added, and the solution was stirred at 70°C. for 6 hours. It was cooled, and poured carefully on to crushed ice (ca.400g.). The resultant aqueous solution was cooled to below 10°C. in an ice-salt bath while the pH was adjusted to 7 by addition of aqueous 40 percent sodium hydroxide. Solid potassium carbonate (600g.) was added, together with benzene (ca. 250ml.), and more water as required to facilitate dissolution, and the whole was stirred at 70°C. for 2 hours. The benzene was separated in the cold and combined with two further benzene extracts of the aqueous layer. The benzene extracts were washed with water, dried over magnesium sulphate, and evaporated to leave a brown oil, which solidified on standing, and which was crystallized from carbon tetrachloride to give α-(4-chlorophenyl)-β-dimethylaminopropenal of m.p. 119°–121°C.

α-(4-Chlorophenyl)-β-dimethylaminopropenal (62.7g.), dissolved in alcohol-free chloroform (100ml.), was added dropwise to a stirred solution of phosgene (50g.) in chloroform (80ml.) which was meanwhile cooled to below 10°C. The mixture was stirred at ambient temperature for 1 hour, and then volatile material was distilled off under reduced pressure. The residual oil was mixed with ether (ca. 250ml.) and water (ca.300ml.), and the ether solution was separated and combined with two further ethereal extracts of the aqueous layer. After being washed in turn with water, dilute aqueous sodium carbonate, and water again, the ether solution was dried over sodium sulphate, and evaporated to leave β-chloro-α-(4-chlorophenyl)propenal as an oil, which solidified on cooling and then had a m.p. of 38°–42°C. It was unstable on storage and was therefore used straight away for the next stage of the synthesis without further purification.

β-Chloro-α-(4-chlorophenyl)propenal (44.0g.), ethyl β-aminocrotonate (68.5g.) and cyclohexane (600ml.) were boiled together under reflux for 9 hours. A small amount of solid was removed by filtration in the cold, and the solution was evaporated to dryness under reduced pressure. The residue was dissolved in dry ether, and an ethanolic solution of hydrogen chloride was added slowly until precipitation was complete. The hydrochloride so obtained was collected by filtration, and mixed with water containing sufficient potassium hydroxide to give alkalinity. The base was extracted into ether, washed with water, dried over sodium sulphate, and recovered by evaporation. Crystallization from 2:1 ethanol: water gave ethyl 5-(4-chlorophenyl)-2-methyl-pyridine-3-carboxylate of m.p. 72°–73°C.

Ethyl 5-(4-chlorophenyl)-2-methylpyridine-3-carboxylate (22.0g.) in dry ether (200ml.) was added slowly to lithium aluminum hydride (3.8g.) stirred in dry ether (120ml.) at 5°–10°C. The whole was stirred at ambient temperature for 1 hour, and then cooled in an ice-water bath while water (200ml.) was added carefully. Ether was distilled off under reduced pressure, and the aqueous suspension was filtered to give a solid. This was triturated with ethyl acetate until no more solid dissolved. The ethyl acetate solution was dried over sodium sulphate and evaporated to leave a solid. This was crystallized from benzene to give 5-(4-chlorophenyl)-3-hydroxymethyl-2-methylpyridine, m.p. 135°–136°C.

Thionyl chloride (7.2ml.) in methylene dichloride (20ml.) was added dropwise to a stirred suspension of 5-(4-chlorophenyl)-3-hydroxymethyl-2-methyl-pyridine (15.4g.) in methylene dichloride (135ml.), maintained at a temperature of 20°–25°C. When addition was complete, the mixture was boiled under reflux for 30 minutes, and was then evaporated to dryness under reduced pressure. The residue was treated with ice-water and sufficient potassium hydroxide to give a pH of 10. Solid was extracted into methylene dichloride, washed with water, dried over sodium sulphate, and recovered by evaporation. Crystallization from cyclohexane gave 3-chloromethyl-5-(4-chlorophenyl)-2-methylpyridine, m.p. 128°–129.5°C.

A mixture of 3-chloromethyl-5-(4-chlorophenyl)-2-methyl-pyridine (14.7g.) and potassium cyanide (4.55g.) in 2-ethoxyethanol (60ml.) and water (30ml.) was boiled under reflux for 2 hours. Solid separated on cooling, and water (100ml.) was added to complete the precipitation. The solid was collected by filtration, washed with water, redissolved in benzene (150ml.), dried over sodium sulphate, treated with decolorizing carbon, and recovered by evaporation of the solvent. Crystallization from carbon tetrachloride gave 5-(4-chlorophenyl)-3-cyanomethyl-2-methylpyridine, m.p. 127°–128°C.

EXAMPLE 7

2-Bromo-3-(4-chlorophenyl)-6-methylpyridine (22.5g.) was added to a suspension of sodium hydride (23g. of 50 percent dispersion in oil—washed with petroleum ether before use) in dimethyl carbonate (120ml.). The whole was heated and stirred under reflux for 20 hours in an atmosphere of nitrogen. The mixture was cooled, and methanol was added to destroy residual sodium hydride, followed by water (200ml.). The aqueous suspension was thoroughly extracted with ether, and the ethereal extract was washed repeatedly with 5N-hydrochloric acid until 3-(4-chlorophenyl)-2-methoxy-6-methylpyridine had been removed as shown by thin layer chromatography. Finally, the extract was washed with dilute aqueous sodium carbonate, then with water, dried over sodium sulphate, treated with decolorizing carbon, and evaporated down to leave a solid which was crystallized from petroleum ether (b.p. 60°–80°C.) to give dimethyl 3-(4-chlorophenyl)-2-methoxypyrid-6-ylmalonate, m.p. 82°–85°C.

The 2-bromo-3-(4-chlorophenyl)-6-methylpyridine used in the above preparation was obtained as follows:

α-(4-Chlorophenyl)-α-hydroxymethyleneacetonitrile (120g.) and acetone (80g.) were well mixed with polyphosphoric acid (1,000g.) and heated steadily to about 130°C., at which temperature a vigorous exothermic reaction set in. The reaction was allowed to proceed on its own, but heat was later applied as required to keep the temperature between 130° and 140°C. for 30 minutes. The cooled mixture was poured on to ice, and the aqueous suspension was stirred for 18 hours before filtration. The crude material was stirred with ethyl acetate and dilute aqueous potassium hydroxide in sufficient quantity to maintain alkalinity. The solid was collected by filtration, and was washed well with water, ethyl acetate, and ether in turn. The 3-(4-chlorophenyl)-1,2-dihydro-6-methyl-2-oxopyridine thus obtained had a m.p. of 232°–240°C. and was sufficiently pure for further use. Recrystallization from propanol gave material of m.p. 242°–245°C.

Freshly distilled phosphorus tribromide (69ml.) was added carefully to a suspension of 3-(4-chlorophenyl)-1,2-dihydro-6-methyl-2-oxopyridine (30g.) in dimethylformamide (150ml.). A solution was obtained initially, but much solid separated later, and it was difficult to maintain stirring as the flask was warmed by being placed in a bath at 180°C. A vigorous exothermic reaction commenced at about 130°C., and the flask was removed from the heating-bath. When the reaction had subsided, the mixture was allowed to cool slightly, and was then poured into water (1,000ml.) containing sufficient ammonia to maintain alkalinity. The mixture was stirred for 30 minutes, and was then extracted with chloroform. The extracts were shaken with decolorizing carbon, filtered, and washed in turn with water, dilute hydrochloric acid, dilute sodium bicarbonate solution, and water. The chloroform was dried over sodium sulphate, and evaporated down to leave a low melting solid. This was redissolved in ether and passed through a column of alumina to remove most of the color. Evaporation of the ethereal eluate yielded 2-bromo-3-(4-chlorophenyl)-6-methylpyridine, m.p. 94°–95C. This was sufficiently pure for further use, but crystallization from petrol (b.p. 60°–80°C.) raised the m.p. to 96°–97°C.

EXAMPLE 8

Dimethyl 3-(4-chlorophenyl)-2-methoxypyrid-6-yl-malonate (3.5g.) was boiled under reflux for 1 hour with methanolic 2N-potassium hydroxide (35ml.). Water (ca. 50ml.) was added, and most of the methanol was distilled off under reduced pressure. The remaining aqueous solution was washed twice with ether, shaken with decolorizing carbon, filtered, and acidified with acetic acid at a temperature below 15°C. The precipitated 3-(4-chlorophenyl)-2-methoxypyrid-6-ylacetic acid decomposed at 97°–98°C.

The above acid was converted into its sodium salt by exact neutralization with sodium bicarbonate in aqueous medium. The solution in water was treated with decolorizing carbon, filtered, and evaporated to dryness. The crude salt was dissolved in a minimum of ethanol, filtered, and diluted carefully with dry ether to cause the slow precipitation of sodium 3-(4-chlorophenyl-2-methoxypyrid-6-ylacetate which decomposed at 236°–238°C.

EXAMPLE 9

Dimethyl 3-(4-chlorophenyl)-2-methoxypyrid-6-yl-malonate (3.0g.) was stirred for 1 hour with sodium hydride (0.41g.; 50 percent dispersion, washed to remove oil) in dry dimethylformamide (25ml.). Methyl iodide (2.5ml.) was added, and gave a mild exothermic reaction. The mixture was stirred at 35°–40°C. for 1 hour, then diluted with water (ca. 30ml.), and warmed under reduced pressure to remove excess of methyl iodide. The solid present was extracted into ether, which was washed three times with water, dried over sodium sulphate, and evaporated to dryness. Crystallization of the residue from methanol, in the presence of carbon, yielded colorless prisms of dimethyl α-[3-(4-chlorophenyl)-2-methoxypyrid-6-yl]-α-methyl-malonate, m.p. 106°–107°C.

EXAMPLE 10

A mixture of sodium hydride (16.8g., 50 percent dispersion in oil—washed before use), dimethyl carbonate (90ml.), and 5-(4-chlorophenyl)-2-methylpyridine (14.25g.) was stirred under nitrogen for 18 hours in an oil-bath at 105°–115°C. The reaction mass was cooled, treated with methanol to destroy sodium hydride, and then treated with water. The solid present was extracted into ether, and the ethereal solution was washed repeatedly with aqueous N-hydrochloric acid until starting material had been removed. Further washing with aqueous sodium carbonate and with water was carried out, and the solution was dried over sodium sulphate and evaporated down to leave a crude solid. This was redissolved in dry ether (ca. 35ml.), and ethanolic hydrogen chloride was added until no more precipitation took place. The hydrochloride was collected by filtration, and reconverted to base by treatment with dilute aqueous potassium hydroxide in the presence of ether. Evaporation of the dried ethereal extract gave dimethyl 5-(4-chlorophenyl)pyrid-2-yl-malonate which, after crystallization from methanol, had m.p. 85°–86°C.

Diethyl 5-(4-chlorophenyl)pyrid-2-ylmalonate was obtained by a similar procedure in which diethyl carbonate was used instead of dimethyl carbonate, and the reaction was carried out at 135°C. for 5 hours. The product melted at 44°–45.5°C. after crystallization from petroleum ether (b.p. 40°–60°C.).

The 5-(4-chlorophenyl)-2-methylpyridine used in these preparations was obtained by treating 2-bromo-3-(4-chlorophenyl) 6-methylpyridine in acetic acid solution with powdered zinc. Filtration of the reaction mixture, followed by neutralization to faint turbidity with aqueous sodium hydroxide, and extraction with ether, led to the isolation of 5-(4-chlorophenyl)-2-methylpyridine, which was crystallized from petroleum ether (b.p. 60°–80°C.) and had m.p. 87°–88°C.

EXAMPLE 11

By proceeding as in Example 8, but using dimethyl 5-(4-chlorophenyl)pyrid-2-ylmalonate instead of dimethyl 3-(4-chlorophenyl)-2-methoxypyrid-6-yl-malonate, there was obtained 5-(4-chlorophenyl)pyrid-2-ylacetic acid as a hemihydrate which melted with decomposition at 102°–103°C., and also its sodium salt which was purified by precipitation from methanolic solution by addition of ether. It decomposed at 260°–262°C.

EXAMPLE 12

By proceeding as in Example 9, but using dimethyl 5-(4-chlorophenyl)pyrid-2-ylmalonate instead of dimethyl 3-(4-chlorophenyl)-2-methoxypyrid-6-yl-malonate, there was obtained dimethyl α-[5-(4-chlorophenyl)pyrid-2-yl]-α-methylmalonate. This was purified by way of its hydrochloride, isolated from ethereal solution of the crude base, followed by reconversion to the base, and crystallization from petroleum ether (b.p. 60°–80°C.); m.p. 58.5°–60°C.

EXAMPLE 13

By proceeding as in Example 8, but using dimethyl α-[5-(4-chlorophenyl)pyrid-2-yl]-α-methylmalonate instead of dimethyl 3-(4-chlorophenyl)-2-methoxypyrid-6-ylmalonate, there was obtained sodium α-[5-(4-chlorophenyl)-pyrid-2-yl]propionate. It was purified by precipitation from methanolic solution by addition of ether, and it decomposed at about 300°C.

By a similar procedure, starting from dimethyl α-[3-(4-chlorophenyl)-2-methoxypyrid-6-yl]-α-methyl-malonate (see Example 9), there was obtained sodium α-[3-(4-chlorophenyl)-2-methoxypyrid-6-yl]propionate, which decomposed at 276°–277°C.

EXAMPLE 14

6-(4-Bromophenyl)-3-cyanomethyl-2-methyl-pyridine (4.0g.) and aqueous 5N-hydrochloric acid (40ml.) were boiled together under reflux for 4 hours. The solid which had separated was collected by filtration of the cooled suspension, and it was extracted with aqueous 2N-potassium hydroxide. The alkaline extract was treated with hydrochloric acid to give a pH of 4. The resulting precipitate was collected by filtration, and washed with water. Crystallization from ethyl acetate gave 6-(4-bromophenyl)-2-methylpyrid-3-ylacetic acid, m.p.188°–189°C. (decomp.).

In a similar fashion, but using 3-cyanomethyl-6-(2,4-dichlorophenyl)-2-methylpyridine instead of 6-(4-bromophenyl)-3-cyanomethyl-2-methylpyridine, there was obtained 6-(2,4-dichlorophenyl)-2-methylpyrid-3-ylacetic acid, m.p.192°–193°C. (decomp.); crystallized from ethyl acetate.

The 6-(4-bromophenyl)-3-cyanomethyl-2-methylpyridine (m.p. 115°–118°C.; crystallized from carbon tetrachloride) used as starting material was obtained by proceeding as in Example 6 but using 6-(4-bromophenyl)-3-chloromethyl-2-methylpyridine in place of 3-chloromethyl-5-(4-chlorophenyl)-2-methylpyridine. In a similar fashion, from the appropriate chloromethyl compound, there was obtained 3-cyanomethyl-6-(2,4-dichlorophenyl)-2-methylpyridine, which was crystallized from petroleum ether (b.p. 80°–100°C.) and had a m.p. of 104°–106°C.

The chloromethyl derivatives used above were obtained by processes analogous to those described in Examples 1 and 6. The following new intermediates were prepared in these syntheses:

Ethyl 6-(4-bromophenyl)-2-methylpyridine-3-carboxylate, m.p.54°–56°C.; crystallized from petroleum ether (b.p. 40°–60°C.).

Ethyl 6-(2,4-dichlorophenyl)-2-methylpyridine-3-carboxylate, m.p.73°–74°C.; crystallized from ethanol/water mixture.

6-(4-Bromophenyl)-3-hydroxymethyl-2-methylpyridine, m.p.130°–131°C.; crystallized from carbon tetrachloride.

6-(2,4-Dichlorophenyl)-3-hydroxymethyl-2-methylpyridine, m.p.114°–115°C.; crystallized from carbon tetrachloride.

6-(4-Bromophenyl)-3-chloromethyl-2-methylpyridine, m.p.99°–100°C.; crystallized from cyclohexane.

3-Chloromethyl-6-(2,4-dichlorophenyl)-2-methylpyridine, m.p.86°–87°C.; crystallized from petroleum ether (b.p.60°–80°C.).

EXAMPLE 15

6-(4-Bromophenyl)-3-cyanomethyl-2-methylpyridine (0.5g.) and a 10 percent solution of potassium hydroxide in 4:1 ethanol: water (5ml.) were boiled under reflux for 10 minutes. The crystals which formed were collected by filtration in the cold, and washed well with water to give 6-(4-bromophenyl)-2-methylpyrid-3-ylacetamide, which was crystallized from ethanol and had a m.p. of 225°–226°C.

EXAMPLE 16

A solution of 2-(4-chlorophenyl)-5-cyanomethylpyridine (0.75g.) in 5N-hydrochloric acid (15ml.) was refluxed for 4 hours, then cooled in ice and adjusted to pH 9–10 with aqueous sodium hydroxide solution (18N). The alkaline solution was washed with two portions of ether, then acidified with glacial acetic acid to pH 4–5; the white crystalline solid was filtered off, washed thoroughly with distilled water and dried in vacuo. There was thus obtained 2-(4-chlorophenyl)pyrid-5-ylacetic acid, which on recrystallization from isopropanol had m.p. 158°–160°C.

The 2-(4-chlorophenyl)-5-cyanomethylpyridine used as starting material was obtained as follows:

A solution of ethyl formate (60g.) and 4-chloroacetophenone (124g.) in anhydrous toluene (200ml.) was added dropwise to a vigorously stirred suspension of sodium hydride (50 percent dispersion; 39.2g.) in toluene (800ml.) containing methanol (20ml.) so that a temperature of 15°–20°C. was maintained. After 4 hours, the thick yellow suspension was treated dropwise with a solution of cyanoacetamide (80g.) in water (700ml.) so that the temperature rose to 30°C. The deep red aqueous layer was separated, washed once with light petroleum, and heated to reflux with stirring. Distillation was continued until the temperature rose to 95°C., a further portion of cyanoacetamide (20g.) was added and the whole refluxed for 2 hours. After acidification with glacial acetic acid (60ml.), the yellow solid was collected by filtration, washed well with distilled water, and then stirred with portions of acetone to remove colored contaminants. There was thus obtained 6-(4-chlorophenyl)-3-cyano-2-pyridone which was suitable for use in subsequent stages. An analytical sample had m.p. 325°–329°C. (crystallized from acetic acid—dimethyl formamide).

Methanol (50ml.) was added cautiously to a solution of 6-(4-chlorophenyl)-3-cyano-2-pyridone (5g.) in concentrated sulphuric acid (50ml.) so that the mixture came to a gentle reflux, and the clear yellow solution was heated for 18 hours on a steam bath. The solution was decanted with stirring onto ice (500g.) and the pale yellow solid was filtered off and washed with distilled water. There was thus obtained 3-carbomethoxy-6-(4-chlorophenyl)-2-pyridone which was suitable for use without purification, and having m.p. 242°–244°C. when analytically pure (crystallized from methanol - dimethyl formamide).

To stirred molten phosphorus oxybromide (6g.) there was added finely ground 3-carbomethoxy-6-(4-chlorophenyl)-2-pyridone (1g.), and the resultant solution was heated in an oil bath at 120°C. for 15 minutes, during which time there was a vigorous evolution of hydrogen bromide. The resultant dark viscous mixture was added to ice with vigorous stirring, and the resulting yellow solid was collected by filtration and washed thoroughly with water. The mixture was stirred with methanol (5ml.) until the mild exothermic reaction had ceased, the suspension was cooled in ice water, and the solid product was removed by filtration and washed with ice-cold methanol. The crude product was dissolved in benzene and filtered through alumina (Spence, grade 'O'; 10g.) to provide white crystalline homogeneous 2-bromo-3-carbomethoxy-6-(4-chlorophenyl)pyridine. An analytical sample (recrystallized from benzene-light petroleum) had m.p. 145°–147°C.

Reduction of 2-bromo-3-carbomethoxy-6-(4-chlorophenylpyridine) was achieved by addition of sodium borohydride (0.58g.) to a suspension of the ester (2.5g.) in ethanol-dimethoxyethane (1:1; 50ml.) stirred at room temperature. After periods of 4 hours and 8 hours, further portions (0.6g.) of sodium borohydride were added, and stirring was maintained for a further 18 hours. The clear solution was diluted with water (200ml.) and the whole extracted thoroughly with ethyl acetate. Evaporation of solvent from the dried organic extracts left 2-bromo-6-(4-chlorophenyl)-3-hydroxymethylpyridine which was suitable for use without purification. Recrystallization from benzene-light petroleum provided analytically pure material of m.p. 140°–141°C.

Zinc powder (0.75g.) was added to a solution of 2-bromo-3-hydroxymethyl-6-(4-chlorophenyl)pyridine (0.75g.) in glacial acetic acid (10ml.), and the resulting suspension was stirred for 2 hours in all, with further portions of zinc (0.75g.) being added after 1 hour and 1½ hours. The suspension was filtered to remove unreacted zinc, and the latter was washed well with small portions of glacial acetic acid. The combined acid layers were diluted with ice and neutralized with ammonia solution (18N). The resultant white precipitate was recovered by extraction with ethyl acetate, and purified by filtration through alumina (10g.) in ether solution. There was thus obtained 2-(4-chlorophenyl)-5-hydroxymethylpyridine which can be obtained in two crystalline forms from benzene-light petroleum (b.p. 60°–80C.): plates of m.p. 85°–87°C. (with resolidification and subsequent melting at 95°C.), or needles of m.p. 95°C.

Thionyl chloride (1.1ml.) was added to a solution of 2-(4-chlorophenyl)-5-hydroxymethylpyridine (2.2g.) in ethylene dichloride (44ml.), and the mixture was stirred at ambient temperature for 30 minutes. The solid left after evaporation of the solvent and excess thionyl chloride was dissolved in water, and the cooled solution was basified with ammonia solution (18N). The precipitated solid was isolated by extraction with ethyl acetate which afforded 2-(4-chlorophenyl)-5-chloromethylpyridine which was suitable for use in the next stage. Recrystallization from light petroleum (b.p.60°–80°C.) provided an analytical sample, m.p. 82°–84C.

A solution of 2-(4-chlorophenyl)-5-chloromethylpyridine (2.25g.) in anhydrous methanol (22.5ml.) was heated under reflux with sodium cyanide (1.4g.) for 4 hours, and then added to water (150ml.) and the whole extracted with 3 portions of ethyl acetate. The combined extracts were washed with sodium chloride solution, dried over magnesium sulphate, and then concentrated in vacuo to yield a brown solid which was redissolved in ether and filtered through alumina (Spence, grade 'O'; 42g.). 2-(4-Chlorophenyl)-5-cyanomethylpyridine was obtained as a white crystalline solid. An analytical sample had m.p. 119°–120°C. [crystallized from benzene-light petroleum (60°–80°C.)].

EXAMPLE 17

A solution of 4-(4-chlorophenyl)-2-cyanomethylpyridine (2.8g.) in 5N-hydrochloric acid (55ml.) was heated under reflux for 6 hours. The mixture was cooled in ice and made alkaline with 18N-aqueous sodium hydroxide solution. The solution was washed twice with ether, and then cooled to 0°–5°C. and made acid with glacial acetic acid. The solid precipitate was filtered off, washed thoroughly with water, and dried in vacuo.

4-(4-Chlorophenyl)pyrid-2-ylacetic acid, m.p. 101°–103°C. (d), thus obtained was converted into the sodium salt by addition to a solution of sodium bicarbonate (0.51g.) in water (20ml.). Evaporation of the clear solution obtained after 1 hour at room temperature provided hydrated sodium 4-(4-chlorophenyl)pyrid-2-ylacetic acid.

The 4-(4-chlorophenyl)-2-cyanomethylpyridine used as starting material was obtained as follows:

Acetone (22.8ml.) and 4-chloro-ω-cyanoacetophenone (51.6g.) were added to polyphosphoric acid (588g.), and the mixture was stirred firstly at room temperature for 5 minutes, then on steam bath for 30 minutes. After the addition of a further portion of acetone (22.8ml.), the mixture was raised to 135°–140°C. in a preheated oil bath, and stirred for 30 minutes. The thick brown mixture was poured slowly into a well-stirred mixture of water (2l.), 18N-ammonia solution (972ml.), and 18N-aqueous sodium hydroxide (80ml.) cooled externally so that the temperature was held at 50°–60°C. When addition was complete, the solution was cooled to room temperature and the solid which precipitated was filtered, washed well with water, then redissolved in chloroform (2.4l.). The organic solution was washed with water, dried over magnesium sulphate, and concentrated under reduced pressure. The residual solid was triturated with ice-cooled ether (360ml.), and the resulting solid was collected by filtration. 4-(4-chlorophenyl)-6-methyl-2-pyridone thus obtained was used without further purification for the next stage. An analytical sample had m.p. 219°–220°C. (crystallized from methanol).

Redistilled phosphorus tribromide (92ml.) was added over 20 minutes to a vigorously-stirred suspension of 4-(4-chlorophenyl)-6-methyl-2-pyridone (20g.) in anhydrous dimethylformamide (126ml.). When the resulting exothermic reaction had ceased, the mixture was placed in an oil bath preheated to 180°C., and heated until a vigorous reaction, with evolution of hydrogen bromide had set in. Heating was maintained for 30 minutes after the vigorous reaction had ceased, and the hot dark mixture was then poured quickly onto a well-stirred solution of concentrated ammonia solution (18N) in ice-water (1.8 l.). The mixture was extracted thoroughly with six portions of chloroform, and the combined extracts were successively washed with hydrochloric acid (1N, 3×300 ml.), water, and saturated sodium bicarbonate solution. The chloroform solution was then dried and the solvent evaporated. The solid residue was dissolved in ether (100ml.) and filtered through a column of alumina (Spence, grade 'O'; 300g.). Continued elution with this solvent, followed by evaporation of the solvent, provided 2-bromo-4-(4-chlorophenyl)-6-methylpyridine. An analytical sample [crystallized from isopropanol-light petroleum (60°–80°C.)] had m.p.88°–90°C.

A solution of 2-bromo-4-(4-chlorophenyl)-6-methylpyridine (10g.) in glacial acetic acid (50ml.) was cooled in an ice bath to 15°–16°C. and stirred, and zinc powder (10g.) was then added in portions. The temperature of the stirred solution was maintained at 18°–20C. during this addition, then allowed to rise to 25°C. and held, by ice cooling when necessary, at this temperature for 30 minutes. A further portion of zinc (10g.) was added, and the suspension was stirred for an additional 30 minutes at 25°C. before filtration to remove unreacted zinc, which was washed thoroughly with chloroform. The combined filtrates were diluted with water, and made alkaline with aqueous ammonia solution (18N), and the resultant suspension was thoroughly extracted with chloroform. The solvent was evaporated under reduced pressure, and residue was adsorbed onto alumina (Spence grade 'O'; 150g.) from ether solution, and chromatographed. Elution, firstly with ether, later with ethylacetate-ether, 1:20, provided 2-methyl-4-(4-chlorophenyl)pyridine. An analytical sample, obtained by recrystallization from light petroleum (60°–80°C.), had m.p. 69°–72°C.

3-Chloroperbenzoic acid (1.76g.) was added to an ice-cooled solution of 2-methyl-4-(4-chlorophenyl)-pyridine (1.2g.) in chloroform (12ml.) and the resultant solution was left for 3 days at 0°–4°C. After addition of N-aqueous sodium hydroxide solution (15ml.), the 2-phase mixture was stirred vigorously for 15 minutes, and the chloroform layer was then separated and washed with further portions of aqueous sodium hydroxide. After evaporation of solvent from the dried chloroform solution, 2-methyl-4-(4-chlorophenyl)pyridine N-oxide was obtained as a crystalline solid suitable for use in the next step. Analytically pure material had m.p. 106°–112°C., and was obtained by recrystallization from benzene-light petroleum (b.p. 60°–80°C.).

Acetic anhydride (73ml.) was added to a solution of 2-methyl-4-(4-chlorophenyl)pyridine N-oxide (24g.) in benzene (240ml.), and the mixture was heated under reflux for 1 hour. After evaporation in vacuo of the solvent and excess acetic anhydride, the residual crude oily mixture was dissolved in methanol (240ml.) containing potassium hydroxide (19g.), and the resultant brown solution was stirred for 1 hour at room temperature. The mixture was concentrated under reduced pressure and the residue partitioned between water and ether. There was thus obtained a dark brown solid from which 4-(4-chlorophenyl)-2-hydroxymethylpyridine was obtained by recrystallization from benzene-light petroleum (b.p.60°–80°C.) as off-white prisms suitable for use in the next step. An analytical sample had m.p. 108°–109°C.

A suspension of 4-(4-chlorophenyl)-2-hydroxymethylpyridine (3.0g.) in ethylene dichloride (29ml.) was stirred and thionyl chloride (1.24ml.) was added dropwise. During the course of the ensuing mildly exothermic reaction, complete dissolution was obtained. The solution was then stirred for 1 hour at room temperature, by which time precipitation of a while solid was complete. The mixture was filtered, the solid residue suspended in water, the pH adjusted to 8 with dilute ammonia solution, and the whole thoroughly extracted with chloroform (3×50ml.). The combined extracts were dried (magnesium sulphate) and the solvent evaporated to give an off-white solid (2.6g.) which was redissolved in ether and filtered through a column of alumina (Spence grade 'O'; 60g.). From the clear filtrate there was obtained 2-chloromethyl-4-(4-chlorophenyl)pyridine, which on recrystallization from light petroleum (b.p.40°–60°C.) had m.p. 74°–76°C.

Finely ground sodium cyanide (3.4g.) was added portionwise to a stirred solution of 2-chloromethyl-4-(4-chlorophenyl)pyridine (5.5g.) in anhydrous dimethyl sulphoxide (55ml.), the temperature being adjusted to 23°–25C. by means of an ice bath. After the initial exothermic phase, the mixture was stirred at room temperature for 1 hour, and then poured into water, (250ml.) and extracted thoroughly with three portions of ether. The combined ethereal layers were washed three times with water, and then dried over magnesium sulphate, and concentrated under reduced pressure.

A sample of the solid residue was recrystallized from benzene-light petroleum (b.p.60°–80°C.) and yielded 4-(4-chlorophenyl)-2-cyanomethylpyridine, m.p. 68°–71C.

EXAMPLE 18

Sodium hydride (50 percent dispersion in mineral oil; 12.0g.) was added to a solution of 2-bromo-4-(4-chlorophenyl)-6-methylpyridine (14.1g.) in redistilled dimethyl carbonate (100ml.) containing methanol (0.5ml.). The resultant suspension was stirred under reflux, under a mercury seal, for 4 hours. A further 50ml. of dimethyl carbonate was added, and reflux maintained for a further 1 hour. The resulting thick pink suspension was added to ice-water (1 l.) containing acetic acid (20ml.) and the whole was extracted with four portions of ether (4×100ml.). The combined extracts were washed with water, dried over magnesium sulphate, and then concentrated in vacuo to a volume of 200ml. The resulting ethereal solution was stirred and treated dropwise with a saturated solution of hydrogen chloride in ether (10ml.), and the precipitated 2-methoxy-4-(4-chlorophenyl)-6-methylpyridine hydrochloride was isolated by filtration, and washed with several portions of ether. The combined ethereal filtrate and washings were washed with water, and the solvent was removed under reduced pressure. The residual oil was dissolved in benzene (100ml.) and the dark solution was extracted with four portions of hydrochloric acid (7.5N; 25ml.; extracts retained—see below), then washed with water, dried over magnesium sulphate, and concentrated under reduced pressure. The residual pale brown solid was crystallized from methanol and gave dimethyl 6-bromo-4-(4-chlorophenyl)pyrid-2-ylmalonate, m.p. 118°–120°C.

The combined hydrochloric acid extracts were basified with aqueous ammonia solution (18N) under strong cooling, and the whole was extracted with several portions of ether. The solvent was evaporated from the combined ether extracts, and the residue was adsorbed on to florisil (135g.) from benzene, and then chromatographed. Elution with benzene removed traces of by-products, and continued elution with ethyl acetate-benzene (successively 1 percent and 2 percent) yielded dimethyl 6-methoxy-4-(4-chlorophenyl)-pyrid-2-ylmalonate, m.p. 112-113°C. [crystallized from light petroleum (b.p.60°–80°C.)].

EXAMPLE 19

Sodium hydride (0.247g.) was added to a solution of dimethyl 4-(4-chlorophenyl)-6-methoxypyrid-2-ylmalonate (see Example 18; 1.5g.) in anhydrous dimethyl formamide (15ml.). The mixture was stirred in an atmosphere of nitrogen until evolution of hydrogen had ceased and complete dissolution had been attained. The clear solution was then treated with methyl iodide (0.915g.) and stirred for a further hour at room temperature. The yellow suspension was poured into water (150ml.) and extracted with three portions of ethyl acetate. The combined organic extracts were washed with water, dried over magnesium sulphate, and concentrated under reduced pressure to a yellow solid. The solid was dissolved as far as possible in ether and the mixture was filtered through a column of alumina (Spence grade 'O', 30g.). The solvent was evaporated from the filtrate to give dimethyl α-methyl α-[4-(4-chlorophenyl)-6-methoxypyrid-2-yl]malonato, m.p. 118°–120°C. [crystallized from light petroleum (b.p.80°–100°C.)].

EXAMPLE 20

A solution of dimethyl α-methyl α-[4-(4-chlorophenyl)-6-methoxypyrid-2-yl]malonate (1.2g.) in 2N- methanolic sodium hydroxide solution (12ml.) was heated under reflux for 1 hour, and the concentrated in vacuo, and the residue dissolved in water (12ml.). The clear solution was adjusted to pH 5 with glacial acetic acid, and the whole was extracted with ethyl acetate. The extract was dried, and the solvent was evaporated. The residue was rapidly triturated with light petroleum (b.p. 40-60°C.) and the resulting mixture filtered to give α-[4-(4-chlorophenyl)-6-methoxypyrid-2-yl]propionic acid, m.p. 84°–87°C. (decomp.).

Esterification of a small sample of this acid with diazomethane afforded the methyl ester, m.p. 65°–67°C. [crystallized from light petroleum (40°–60°C.)].

EXAMPLE 21

Dimethyl α-[6-bromo-4-(4-chlorophenyl)pyrid-2-yl]-malonate was hydrolyzed with methanolic sodium hydroxide solution by the method described in Example 20, and 6-bromo-4-(4-chlorophenyl)pyrid-2-ylacetic acid was obtained, m.p. 142°–143°C. (decomp.) [crystallized from acetone-light petroleum (40°–60°C.)]. The sodium salt was obtained by addition of the acid (2.264g.) in portions to a well-stirred solution of sodium bicarbonate (0.584g.) in water (20ml.). When a clear solution had been attained, the water was evaporated under reduced pressure, and the residual white solid was crystallized from aqueous acetone. There was thus obtained hydrated sodium 6-bromo-4-(4-chlorophenyl)pyrid-2-ylacetate.

EXAMPLE 22

A solution of methyl α-[2-(4-chlorophenyl)-6-methylpyrid-5-yl]-α-cyanopropionate (6g.) in 5N-hydrochloric acid (60ml.) was refluxed for 6 hours. The solution was cooled, basified with aqueous sodium hydroxide, washed with two portions of ether, and then acidified with glacial acetic acid. The precipitated acid was filtered off, washed well with distilled water, and dried in vacuo. Crystallization of the solid from benzene provided large prisms of α-[6-(4-chlorophenyl)-2-methylpyrid-3-yl]-propionic acid, which was heated for 4 hours at 110°C. to remove benzene of crystallization, and leave unsolvated acid of m.p. 164°–166°C.

The methyl α-[2-(4-chlorophenyl)-6-methylpyrid-5-yl]-α-cyanopropionate used as starting material was obtained as follows:

Sodium hydride (50 percent dispersion, 1.4g.) was added to a solution of 2-(4-chlorophenyl)-5-cyanomethyl-6-methylpyridine (6.06g.) in dimethyl carbonate (60ml.) containing methanol (0.1ml.), and the resulting suspension was stirred at room temperature for 3 hours. The resulting thick suspension was diluted with anhydrous ether (60ml.), and the mixture was filtered and the solid residue washed with several portions of ether. The solid was the crude α-sodium derivative of methyl α-[2-(4-chlorophenyl)-6-methylpyrid-5-yl]-α-cyanoacetate. Acidification of a sample of the solid with glacial acetic acid gave methyl α-[2-(4-chlorophenyl)-6-methylpyrid-5-yl]-α-cyanoacetate, m.p. 81°–83°C., fine needles, and 87°–90°C., large prisms [crystallized from benzene-light petroleum (b.p.60°–80°C.)].

The crude sodium derivative (ca. 6 g.) was dissolved in dimethoxyethane (60ml.), methyl iodide (2.5ml.) was added, and the solution was stirred at room temperature for 18 hours. After evaporation of solvent under reduced pressure, the residue was partitioned between water and ether, the organic layer separated, and the aqueous solution extracted with two further portions of ether. The combined ethereal solution and extracts were dried, and the solvent evaporated, to give methyl α-[2-(4-chlorophenyl)-6-methylpyrid-5-yl]-α-cyanopropionate suitable for use without purification. Recrystallization from benzene-light petroleum (b.p. 60°–80C.) provided an analytically pure sample of m.p. 100°–101°C.

EXAMPLE 23

A solution of triethylamine (2.07g.) and 6-(4-chlorophenyl)-2-methylpyrid-3-ylacetic acid (5.3g.; see Example 2) in ethanol (74o.p.; 125ml.) was shaken with 5 percent palladium on charcoal catalyst (0.5g.) in an atmosphere of hydrogen until adsorption has ceased (approximately 1½ hours). The mixture was filtered to remove catalyst, and the filtrate was evaporated under reduced pressure. The residue was stirred with distilled water and the resulting precipitate was isolated by filtration and washed well with distilled water. There was thus obtained 2-methyl-6-phenylpyrid-3-ylacetic acid, m.p. 138°–139°C. (crystallized from benzene).

EXAMPLE 24

2-(4-Chlorophenyl)-4-cyanomethylpyridine (7.05g.) was dissolved in hot 5N-hydrochloric acid (70ml.), and the resulting solution was heated under reflux for 4½ hours. The mixture was then well cooled and adjusted to pH 10–11 with 18N-sodium hydroxide solution. The resulting aqueous solution was extracted once with ether (50ml.), and then adjusted to pH 4 with glacial acetic acid. The resulting white precipitate was filtered off, and washed well with distilled water, and dried. The solid (0.1g.) was dissolved as much as possible in acetone (0.5ml.), the mixture was filtered, and the the filtrate was added petroleum ether (b.p. 60°–80°C.; 2.5ml.) while the mixture was cooled to −20°C. The resulting mixture was filtered to give 2-(4-chlorophenyl)pyrid-4-ylacetic acid, m.p. 100°–102°C. (decomp.). This acid 4.08g.) was added portionwise at room temperature to a vigorously stirred solution of sodium bicarbonate (1.374g.) in water (40ml.) and acetone (10ml.), and the clear solution thus obtained was evaporated in vacuo to give sodium 2-(4-chlorophenyl)-pyrid-4-ylacetate monohydrate, m.p. over 300°C. (crystallized from acetone-water).

The 2-(4-chlorophenyl)-4-cyanomethylpyridine used as starting material was obtained as follows:

A solution of 4-chlorobromobenzene (192g.) in tetrahydrofuran (500ml.) was added dropwise to a vigorously-stirred suspension of magnesium turnings (24g.) in tetrahydrofuran (150ml.) so that the temperature remained at 35°–40°C. (cooling with ice water was required). When formation of 4-chlorophenylmagnesium bromide was complete, finely ground 4-picoline N-oxide (109g.) was added portionwise at such a rate as to hold the temperature at 40°–45°C. When addition was complete, the resulting dark red solution was heated a further 1½ hours at this temperature. The solution was then cooled to 15°–20°C. and vigorously stirred while a cold solution of ammonium chloride (100g.) in water (450ml.) and saturated aqueous sodium chloride solution (250ml.) was added at such a rate that the temperature did not rise above 25°C. Ether (500ml.) and ethyl acetate (250ml.) were then added. The organic layer was separated, and the aqueous layer was extracted with ether-ethyl acetate (4:1; 2×250ml.). The combined organic extracts were evaporated, and the solid residue was dissolved in benzene (1 l.) and acetate anhydride (96ml.), and the solution was heated under reflux for 1½ hours. The dark solution was cooled and extracted thoroughly with 2N-hydrochloric acid. The acidic layers were washed with ether, and neutralized with 18N-ammonium hydroxide solution. The oily solid thus liberated was extracted with ether, and the ethereal extracts were concentrated and filtered through alumina (Spence grade 'O'; 1kg.). The solvent was evaporated from the filtrate and there was thus obtained 2-(4-chlorophenyl)-4-methylpyridine, m.p. 62°–64°C. [crystallized from light petroleum (40°–60°C.)].

Sodium hydride (0.40g.; 50 percent dispersion in mineral oil) was added to a solution of ethyl oxalate (5.88ml.) and 2-(4-chlorophenyl)-4-methylpyridine (5.075g.) in anhydrous dimethylformamide (50ml.) held at 105°C. under nitrogen, and the mixture was stirred vigorously until reaction commenced (approximately 5 minutes). The brown suspension was cooled as quickly as possible to 70°C., and sodium hydride (1.70g.) was added portionwise over 10 minutes to maintain a steady effervescence. Stirring was continued until hydrogen evolution had ceased (10 minutes), and the brown solution was then decanted with stirring on to ice-water (250ml.) containing acetic acid (1.5ml.). Ethyl 3-[2-(4-chlorophenyl)pyrid-4-yl]pyruvate was thus obtained as a yellow solid which was isolated by filtration, washed thoroughly with water, and used without further purification. An analytical sample, obtained by recrystallization from benzene-light petroleum (b.p. 60°–80°C.), had m.p. 130°–132°C. Crude ethyl 3-[2-(4-chlorophenyl)-pyrid-4-yl]pyruvate (ca. 7g.) was heated under reflux with sodium acetate (3g.) and hydroxylamine hydrochloride (1.54g.) in ethanol (50ml.) for 40 minutes. Potassium hydroxide pellets (5g.) and water (10ml.) were then added cautiously, and the reflux was continued for a further 30 minutes. The deep red solution was concentrated in vacuo, and the residual oil was dissolved in water (100ml.), and then cooled and acidified with glacial acetic acid to pH4-5. The mixture was filtered and the sticky solid residue was stirred with a mixture of methanol (5ml.) and benzene (50ml.) to yield the oxime of 3-[ 2-(4-chlorophenyl)pyrid-4-yl]pyruvic acid (5g.) as an off-white solid. This oxime was added over 5 minutes to stirred acetic anhydride (35ml.) heated on a steam bath. The deep red solution was heated for a further 10 minutes until evolution of carbon dioxide had ceased, and then concentrated in vacuo. The residual oil was dissolved in ether, and washed with saturated aqueous sodium bicarbonate. The ethereal solution was concentrated in vacuo and the deep red solution filtered through alumina (100g.; Spence, grade 'O'). Continued elution with ether provided pure 2-(4-chlorophenyl)-4-cyanomethylpyridine, m.p.85°–87°C. [crystallized from benzene-light petroleum (b.p. 60-80°C.)].

EXAMPLE 25

2-(4-Chlorophenyl)-4-cyanomethylpyridine (6g.) was dissolved in methanol (30ml.) containing concentrated sulphuric acid (9.3ml.), and the pale yellow solution was refluxed for 24 hours. The solution was added to ice (150g.), the pH was adjusted to 8 with aqueous ammonia (18N; 19ml.), and the desired ester was isolated by ether extraction. Evaporation of the solvent and crystallization of the residue from petroleum ether (b.p. 40°–60°C.) gave methyl 2-(4-chlorophenyl)pyrid-4-ylacetate, m.p. 48°–49°C.

EXAMPLE 26

2-(4-Chlorophenyl)-4-(α-cyanoisopropyl)pyridine (1.4g.) was hydrolyzed by treatment with 5N-hydrochloric acid by the method described in Example 24 to give α-[2-(4-chlorophenyl)pyrid-4-yl]isobutyric acid. A sample of this acid (0.58g.) was added slowly to a well-stirred solution of excess diazomethane in ether (50ml.) over 10 minutes with ice cooling. When evolution of nitrogen had ceased, the solvent was removed in vacuo to yield methyl α-[2-(4-chlorophenyl)pyrid-4-yl]isobutyrate, m.p. 71°–72°C. [crystallized from light petroleum (40°–60°C.)]

The 2-(4-chlorophenyl)-4-(α-cyanoisopropyl)-pyridine used as starting material was obtained as follows:

2-(4-Chlorophenyl)-4-cyanomethylpyridine (5.7g.) was added to a solution of sodamide [obtained from sodium (0.595g.) in liquid ammonia (240ml.)] and the suspension was stirred until a clear green solution was obtained. Methyl iodide (4.7ml.) was added in one portion, and the solution was stirred for 30 minutes. After evaporation of all ammonia, the residual solid was partitioned between ether and saturated aqueous sodium chloride solution. The organic phase was separated and the aqueous phase was extracted with two further portions of ether. The combined ethereal extract and washings were evaporated to give a mixture of nitriles (5g.) which was separated by chromatography on alumina (Woelm grade 1, neutral; 200g.). Elution with benzene gave a solid fraction (1.7g.) which when recrystallized from benzene-light petroleum (b.p. 60°–80C.) gave 2-(4-chlorophenyl)-4-(α-cyanoisopropyl)pyridine, m.p. 94°–96°C.

EXAMPLE 27

Methyl α-[2-(4-chlorophenyl)pyrid-4-yl]-α-cyano-propionate (1.42g.) was hydrolyzed using 5N-hydrochloric acid by a similar method to that described in Example 22, after which the product was converted into the sodium salt by treatment with sodium bicarbonate. There was thus obtained sodium α-[2-(4-chlorophenyl)pyrid-4-yl]propionate (crystallized from isopropanol).

The α-cyano compound used as starting material was obtained as follows:

A suspension of sodium hydride (50 percent dispersion; 0.55g.) in dimethyl carbonate (23ml.) containing 2-(4-chlorophenyl)-4-cyanomethylpyridine (2.285g.) and methanol (0.1ml.) was stirred at room temperature. After 20 minutes, a vigorous exothermic reaction set in, and solution became very thick and pink in color. Stirring was continued for a further 40 minutes, after which the mixture was filtered. The solid residue, which was the sodium derivative of methyl α-[2-(4-chlorophenyl)pyrid-4-yl]-α-cyanoacetate, was washed with several portions of anhydrous ether, dissolved immediately in dimethoxy ethane (20ml.) and treated at room temperature with methyl iodide (1ml.) for 18 hours. After evaporation of the solvent in vacuo, the residue was partitioned between benzene and water, the mixture filtered to remove insoluble material, and the organic layer then separated. The organic layer was extracted twice with 2N-hydrochloric acid (10ml. each time), and then with three portions of 5N-hydrochloric acid (30ml., 10ml., 10ml.). The latter extracts were combined, neutralized with ammonia (18N), and the product extracted with benzene (50ml.). The solvent was evaporated and there was thus obtained methyl α-[2-(4-chlorophenyl)pyrid-4-yl]-α-cyanopropionate, m.p. 98°–99°C. [crystallized from benzene-light petroleum (b.p.60°–80°C.)].

EXAMPLE 28

A suspension of 6-(4-chlorophenyl)-2-methylpyrid-3-ylacetic acid (1.55g.) and sodium bicarbonate (0.498g.) in 1:1 water-methanol (15ml.) was stirred vigorously until effervescence had ceased and a clear solution had been obtained. The solvents were evaporated under reduced pressure, and the sodium salt was dried by adding benzene (25ml.) and then evaporating it; the latter procedure was carried out three times. The anhydrous white solid was suspended in anhydrous dimethylformamide (15ml.), ethyl bromide (1 ml.) was added, and the mixture was stirred for 18 hours at room temperature. Water (75ml.) was added to the clear solution, and the whole was extracted with 1:1 ether-light petroleum (b.p. 40°–60°C.; 3×25ml.). The combined organic layers were washed with water (2×25ml.), dried over magnesium sulphate, and concentrated in vacuo to yield ethyl 6-(4-chlorophenyl)-2-methylpyrid-3-ylacetate (1.64g.). Recrystallization from light petroleum (b.p. 40°–60°C.) gave fine white needles of m.p. 54°–55°C.

EXAMPLE 29

6-(4-Chlorophenyl)-2-methylpyrid-3-ylacetic acid (2.09g.) was added to a solution of sodium hydrogen carbonate (0.67g.) in water (30ml.), and the mixture was warmed to 40°C. and stirred until the solid had dissolved. The liquid was clarified by filtration in the presence of filtercel, and the filtrate was stirred at ambient temperature during the addition of a solution of hydrated aluminum nitrate (0.85g.) in water (7ml.), and for 1 hour thereafter. The resultant precipitate was collected by filtration, washed well with water, and dried in vacuo over phosphorus pentoxide to give aluminum 6-(4-chlorophenyl)-2-methylpyrid-3-ylacetate, m.p. 295°–297°C. (decomposition).

EXAMPLE 30

A mixture of 6-(4-chlorophenyl)-2-methylpyrid-3-ylacetic acid (100g.) and maize starch (300g.) was granulated with a sufficient quantity of 10% w/v starch paste. The granules were passed through a 20-mesh screen, and were dried at a temperature not exceeding 50°C. The dried granules were blended with magnesium stearate (4g.), and then compressed into tablets containing from 50 to 250 mg. of active ingredient. There were thus obtained tablets suitable for oral use for therapeutic purposes.

The pyridine derivatives of this invention exhibit anti-inflammatory, analgesic and antipyretic activity and they reduce the concentration of fibrinogen and of cholesterol and/or triglycerides in blood; for example they exhibit such activity in standard experimental animals (rats or mice), and they may therefore be used in the treatment of man of other host needing such activity. On the basis of results in standard experimental animals we consider that said pyridine derivatives may be used clinically in man in the formulations and at the doses indicated below, depending upon the clinical effect that is desired:

1. Anti-inflammatory effect

One of said pyridine derivatives, for example α-[6-(4-chlorophenyl)-2-methylpyrid-3-yl]propionic acid, may be administered orally in the form of a tablet at a total daily dose of 25–500mg. of said derivative per 70kg. man. Alternatively, said derivative may be administered topically in the form of an ointment or cream containing 2.5–7.5 percent by weight of said derivative, the ointment or cream being administered as necessary.

2. Analgesic effect

Said pyridine derivative may be administered orally in the form of a tablet at a total daily dose of 25–500mg. of said derivative per 70kg. man.

3. Antipyretic effect

Said pyridine derivative may be administered orally in the form of a tablet at a total daily dose of 25–500mg. of said derivative per 70kg. man.

4. Reduction of concentration of fibrinogen, cholesterol and/or triglycerides

Said pyridine derivative may be administered orally in the form of a tablet at a total daily dose of 25–500mg. of said derivative per 70kg. man.

What we claim is:

1. A pharmaceutical composition comprising a pharmaceutically effective amount of a compound a compound selected from the group consisting of a pyridine derivative of the formula

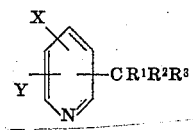

wherein:
X is a member selected from the group consisting of hydrogen, alkyl of not more than three carbon atoms, alkoxy of not more than three carbon atoms, and a halogen atom;
Y is a member selected from the group consisting of phenyl and phenyl substituted by not more than two halogen atoms;
$R^1$ is a member selected from the group consisting of hydrogen and alkyl of not more than three carbon atoms;
$R^2$ is a member selected from the group consisting of hydrogen, alkyl of not more than three carbon atoms, and alkoxycarbonyl of not more than six carbon atoms;

$R^3$ is a member selected from the group consisting of —$CONH_2$ and —$CO_2R^4$, wherein $R^4$ is a member selected from the group consisting of hydrogen and alkyl of not more than five carbon atoms;

and the Y and $CR^1R^2R^3$ radicals are linked to non-adjacent carbon atoms of the pyridine nucleus;

and a non-toxic pharmaceutically acceptable salt thereof, said compound being in admixture with a major amount of a non-toxic, pharmaceutically acceptable diluent.

2. A composition as claimed in claim 1 wherein said compound is one wherein:

X is a member selected from the group consisting of hydrogen, methyl, methoxy, chlorine and bromine;

Y is a member selected from the group consisting of phenyl and phenyl substituted with not more than two halogen substituents selected from the group consisting of fluorine, chlorine and bromine;

$R^1$ is a member selected from the group consisting of hydrogen and methyl;

$R^2$ is a member selected from the group consisting of hydrogen, methyl, methoxycarbonyl and ethoxycarbonyl;

$R^3$ is a member selected from the group consisting of —$CONH_2$ and —$CO_2R^4$ wherein $R^4$ is a member selected from the group consisting of hydrogen, methyl and ethyl;

and non-toxic pharmaceutically-acceptable salts thereof.

3. A composition as claimed in claim 1 wherein said compound is 6-(4-chlorophenyl)-2-methylpyrid-3-ylacetic acid.

4. A composition as claimed in claim 1 wherein said compound is α-[6-(4-chlorophenyl)-2-methylpyrid-3-yl]propionic acid.

5. A composition as claimed in claim 1 wherein said compound is dimethyl 5-(4-chlorophenyl)pyrid-2-ylmalonate.

6. A composition as claimed in claim 1 wherein said compound is sodium 5-(4-chlorophenyl)pyrid-2-ylacetate.

7. A composition as claimed in claim 1 wherein said compound is sodium 3-(4-chlorophenyl)-2-methoxypyrid-6-ylacetate.

8. A composition as claimed in claim 1 wherein said compound is sodium 2-(4-chlorophenyl)pyrid-4-ylacetate.

* * * * *

UNITED STATES PATENT OFFICE
CERTIFICATE OF CORRECTION

Patent No. 3,699,227　　　　　　Dated October 17, 1972

Inventor(s) Peter Doyle and Joseph Gilbert Stacey

It is certified that error appears in the above-identified patent and that said Letters Patent are hereby corrected as shown below:

In the heading of the patent, add:

--Foreign Application Priority Data

[30]　December 2, 1966　Great Britain...54135/66--

Column 1, line 13, "of prophylaxis" should read -- prophylaxis or --

Column 20, line 61, "malonato" should read --malonate--

Column 23, line 9, "acetate" should read --acetic--

Column 26, line 13, "man of other host" should read --man or other host--

Column 26, lines 45-46, "a compound" should be deleted.

Signed and sealed this 22nd day of April 1975.

(SEAL)
Attest:

RUTH C. MASON
Attesting Officer

C. MARSHALL DANN
Commissioner of Patents
and Trademarks